(No Model.)
H. F. SHAW.
TRUCK FOR STREET CARS.
No. 502,503. Patented Aug. 1, 1893.
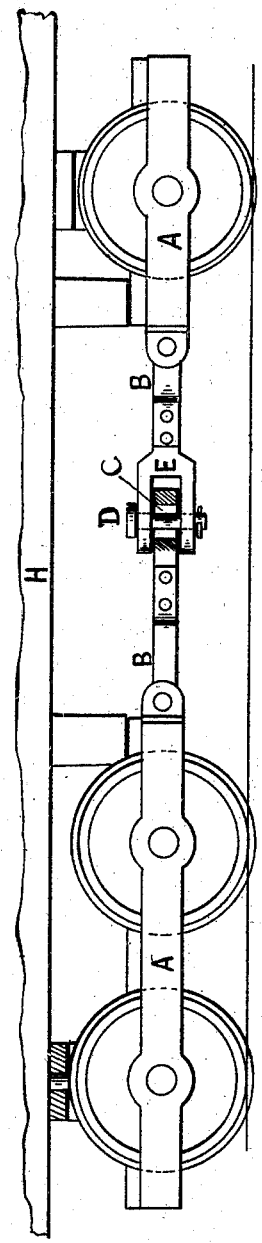
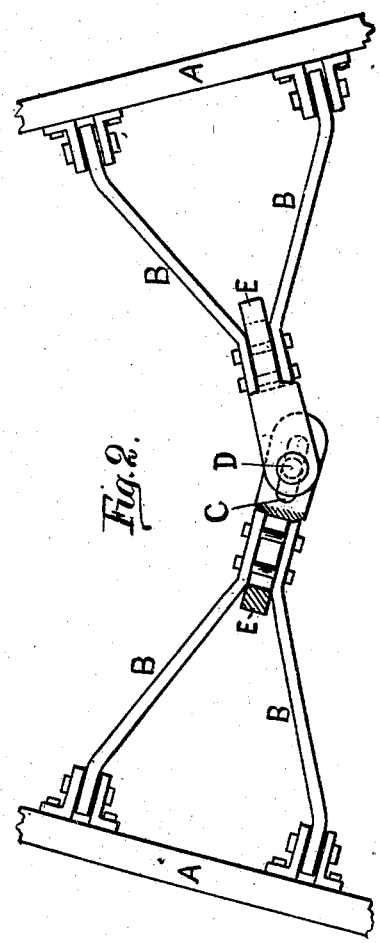
Witnesses
Chas. E. Crandal
E. E. Emanuel
INVENTOR.
Henry F. Shaw,
By Sylvenus Walker
Attorney

UNITED STATES PATENT OFFICE.

HENRY F. SHAW, OF BOSTON, MASSACHUSETTS, ASSIGNOR TO THE SHAW RADIAL CAR TRUCK COMPANY, OF SAME PLACE.

TRUCK FOR STREET-CARS.

SPECIFICATION forming part of Letters Patent No. 502,503, dated August 1, 1893.

Application filed October 29, 1892. Serial No. 450,387. (No model.)

*To all whom it may concern:*

Be it known that I, HENRY F. SHAW, of Boston, in the county of Suffolk and State of Massachusetts, have invented an Improvement in Trucks for Street-Cars, of which the following is a specification.

The object of my invention is to provide radial truck frames for street cars, which shall run upon a short curve, a reverse curve, or one truck upon a straight portion of track and the opposite truck upon a short curve in the track, with the same ease, or without increasing the friction between the rails and the flanges of the wheels, when passing over, or around such curves, over that on a straight track; and it consists in the construction, combination, and arrangement of the pivoted devices connecting the opposite truck frames with each other as hereinafter more fully described and specifically set forth in the claim.

In the drawings hereto annexed which form a part of this specification, Figure 1 represents a sectional elevation of truck-frames pivoted together according to my invention. Fig. 2 represents a sectional plan view showing the pivoted connecting devices, without the frames.

A, A, represent the opposite truck-frames, one of which has a single pair of wheels, while the opposite frame is provided with two pairs of wheels and which serve as a steering-truck, as the flanges of the two wheels on each side of the truck-frame have a tendency to guide the truck in proper position between the rails, so as to prevent their running off, or leaving the tracks when passing over switches, or around curves. These truck frames, A, A, are each pivoted centrally to tne under side of the car body H in the usual manner heretofore employed for the purpose. The inward ends of the said truck-frames A, A, have each pivoted therewith the outward ends of the oblique connecting bars B, B, B, B, their opposite ends being bolted or secured to the opposite ends of the two central actuating connecting pivoted bars E, E, one of which is provided with an oblong hole, or vertical slot C, through which passes the pivot bolt D, inserted through the bifurcated ends of the opposite hinge bar-piece E, so as to permit the joint connection to slide or move axially on or about the pivot-bolt D, when the opposite truck-frames are passing on to the curve, or over a curve in the track, being brought into a radial position, with relation to each other, thereby compensating for the varying distance between the two connecting portions of the opposite truck-frames at their central longitudinal lines, when moved from a straight line between their pivotal connections with the car-body H, or as shown and above described. The said oblique connecting bars B, may also be slotted, or adjustably connected to the said hinge bar-piece E, so as to be secured thereto at variable points, so as to permit the said truck-frames A, to be adapted to pass around the shortest curves formed in the tracks over which the car is liable to pass in traversing the route over which it is to run. It will be seen and understood that the said hinge bar-pieces E, provided with a sliding pivotal connection between them, is very important to the operation of the two connecting truck-frames A, A, as the trucks could not pass around a short curve were the truck-frames connected together by the actuating bars closely pivoted together, centrally, as they could not turn radially sufficient to serve the purposes contemplated by my invention.

Now in order that the said truck having the single pair of wheels, may be made to turn, or run on to a curve in the track in different radiuses, or on different segments of varying curves, or so that when the truck frame having two pairs of wheels is guided around the curve in the track by the flanges of the wheels coming into contact with the side portion of the rails, the two wheel truck may be made to run on this predetermined curve without the flanges of the wheels bearing against the sides of the track, by placing the pivot bolt of the bar-pieces E, E, nearer the two wheel truck-frame pivotal point to the body, than the said pivot bolt D, is to pivot of the said four wheel truck frame, or to its pivotal bearing with the car body A, as shown in Fig. 1.

Having thus described my invention, I claim—

Street car truck frames connected together by four oblique bars, the outward ends of which are pivoted to the opposite truck frames and their inward ends adjustably connected to the opposite ends of short central bars having a sliding pivotal joint connection, whereby the said central sliding pivotal joint may be adjusted to a point eccentric to the pivots of the said truck frames to the car body, substantially as described, as and for the purposes set forth.

HENRY F. SHAW.

Witnesses:
SYLVENUS WALKER,
HARRY C. CLAPP.